United States Patent [19]

Fomby

[11] Patent Number: 5,009,468
[45] Date of Patent: Apr. 23, 1991

[54] RESILIENT ARM REST

[76] Inventor: K. A. Fomby, P.O. Box 636, Gainesville, Tex. 76240

[21] Appl. No.: 902,474

[22] Filed: Aug. 29, 1986

[51] Int. Cl.[5] .............................................. A47C 7/54
[52] U.S. Cl. ..................................... 297/412; 297/214
[58] Field of Search ............... 297/195, 214, 411, 412, 297/416, 422; 248/118, 118.1

[56] References Cited

U.S. PATENT DOCUMENTS

| | | |
|---|---|---|
| 2,318,841 | 5/1943 | Dodge . |
| 2,690,212 | 9/1954 | Jakeway . |
| 3,137,527 | 6/1964 | Hoven et al. .................... 297/412 |
| 3,300,250 | 1/1967 | Dollgener et al. . |
| 3,604,748 | 9/1971 | Lamkemeyer ................ 297/214 |
| 3,758,154 | 9/1973 | Kitaguchi ..................... 297/214 |
| 4,019,779 | 4/1977 | Hogan . |
| 4,099,780 | 7/1978 | Schmidhuber . |
| 4,331,360 | 5/1982 | Roudybush ................. 297/411 X |
| 4,496,190 | 1/1985 | Barley ............................ 297/411 |

FOREIGN PATENT DOCUMENTS

| | | | |
|---|---|---|---|
| 2325696 | 2/1974 | Fed. Rep. of Germany ...... 297/214 |
| 1096429 | 2/1955 | France ................................ 297/214 |
| 1107614 | 8/1955 | France ................................ 297/214 |
| 1307997 | 9/1962 | France ................................ 248/118 |
| 2305338 | 3/1975 | France ................................ 297/195 |

Primary Examiner—Peter A. Aschenbrenner

[57] ABSTRACT

A resilient accessory to be used as a cap for the arm rest of a seat, specifically a passenger seat on an airplane, bus, or other carrier. A lower rigid base member is provided having suitable mounting tabs for attachment to a passenger seat. An upper resilient member is positionable over the base and has a pair of lower edges for enveloping and retaining a pair of rigid angled strips. Air pockets with a suitable support spine and partitions are formed within the upper resilient member. The base is spot welded or glued to the angled strips. In an alternative embodiment, the base member includes lower side edge walls which are enveloped by the lower edges of the upper resilient member for retaining the upper resilient member and base in position. Suitable filler material may be disposed between the base and the upper resilient member for providing enhanced padding. The upper resilient members may be formed by injection molding according to the desired specifications about the base member.

9 Claims, 1 Drawing Sheet

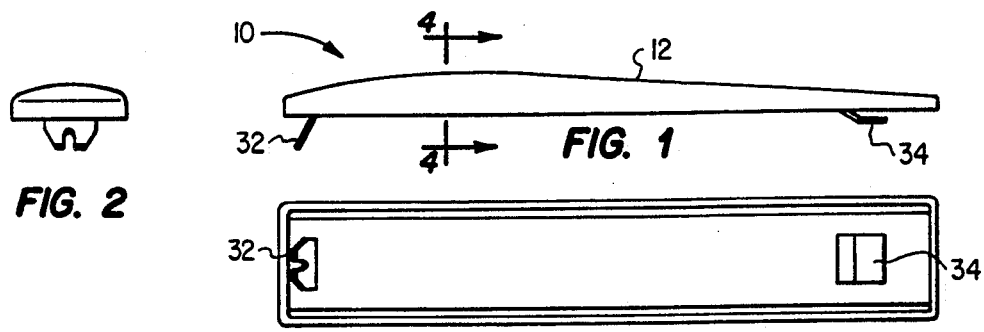
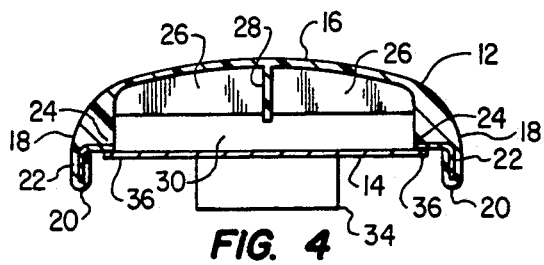
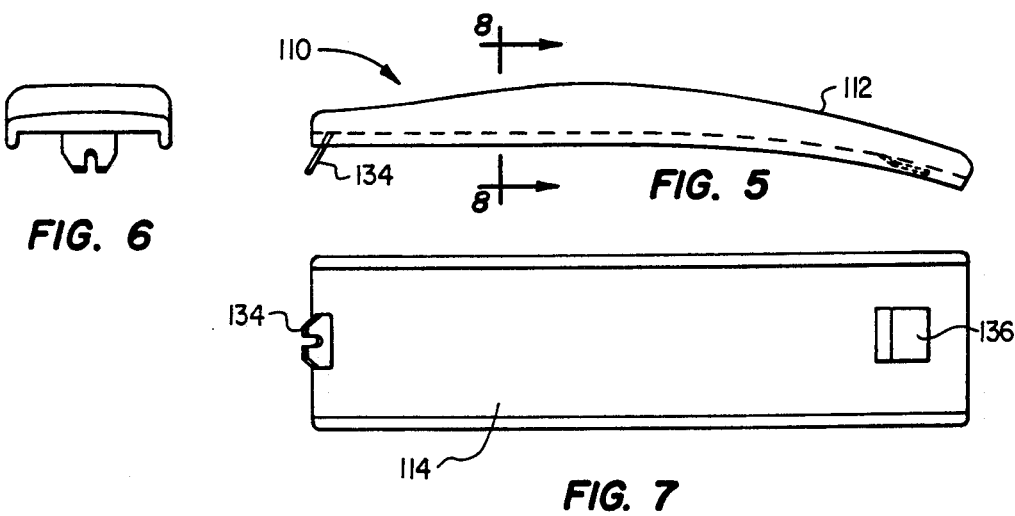
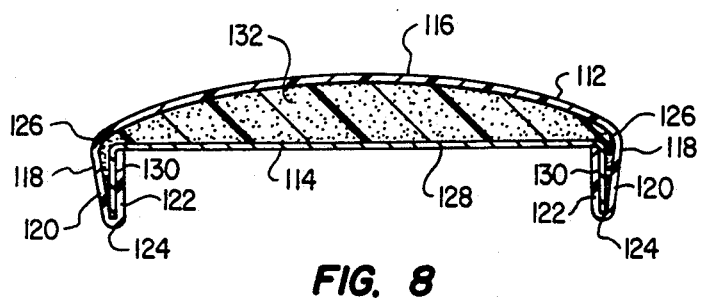

RESILIENT ARM REST

TECHNICAL FIELD

The present invention relates in general to resilient accessories used primarily as cushions for arm rests attached to seats on airplanes, buses, or other passenger carriers, and in particular to a resilient arm rest cap.

BACKGROUND

It is well known in the prior art that arm rest cushions may consist of a relatively soft, resilient member attached to a relatively rigid member for support and mounting purposes, as disclosed in U.S. Pat. Nos. 2,690,212; 3,300,250; 4,019,779; 4,099,780 and 4,331,360. Pockets or sponge-like filler may also be employed to provide additional resiliency and improve the compressive strength of the resilient member, as disclosed in U.S. Pat. Nos. 2,318,841; 2,802,519; 3,300,250; 4,019,779 and 4,331,360. However, the art has generally lacked the simplified manufacturing, assembly, and maintenance qualities of the invention described in this application.

The federal government's recent deregulation of the airline industry has resulted in a drastic increase in the degree of competition between the various airlines, forcing airline management to pay special attention to cost cutting in every possible aspect of their operations. There has therefore been a particular need for efficient and economical production of non-critical components in the industry, specifically passenger compartment seating accessories. The use of injection molded plastics for construction of commercial airline seating has significantly reduced the cost in maintaining the interior of heavily trafficked passenger airliners.

In particular, the arm rests require frequent replacement due to wear and inadvertent passenger destruction. While many of the plastic arm rests existing in the art are certainly suitable for use in conjunction with passenger airlines, an improved padded arm rest having the important characteristics of durability, simplicity of construction, and economical production cost has been desired yet has heretofore been unrealized in the industry.

SUMMARY OF THE INVENTION

The present invention is directed to a resilient accessory to be used as a cap for the arm rest of a passenger seat. A lower rigid base member is provided having suitable mounting tabs for removably securing the arm rest cap to a passenger seat. An upper resilient member is positionable over the base member for providing padding and communication with the user's arm. The upper resilient member may be constructed of any suitable plastic material. The upper resilient member includes a pair of lower edges which serve to envelop and retain a pair of rigid angled strips. The rigid angled strips, along with the base, are constructed of aluminum, plastic, or any other suitably rigid material. Air pockets may be formed in the upper resilient member to provide additional cushioning qualities to the arm rest cap. The resilient member may also include a rigid spine along its dorsal length and a plurality of partitions to support the resilient member over the base. The base is attached to the angled strips along lateral contact surfaces by contact welds, glue, or any other suitable means. The arm rest cap may be formed by injection molding according to required design specifications.

In an alternative embodiment, the lower rigid base member includes a pair of side edge walls. The upper resilient member includes a pair of lower edges, which envelop and retain the side edge walls, thereby securing the resilient member to the rigid base. The side edge walls of the base member function in a manner similar to the angled strips in the first embodiment, to position and secure the resilient member to the base. Where the resilient member fits over and envelops the base in this manner, the arm rest cap is resistant to destruction yet assembled in a simplified manner. In lieu of air pockets formed within the upper resilient member, suitable foam material may be inserted between the rigid base member and the resilient member to provide enhanced padding characteristics. In this embodiment, the necessity for spot welding or glueing the base to the angle strips is removed, since the side edge walls of the base are enveloped by the lower edges of the resilient member.

BRIEF DESCRIPTION OF DRAWINGS

FIG. 1 is a side view of one embodiment of the present invention, specifically, a cap for the armrest of a seat, such as used in an airplane, including an upper resilient member and a lower rigid base member;

FIG. 2 is an end view of the embodiment of FIG. 1;

FIG. 3 is a bottom plan view of the embodiment of FIG. 1, showing the rigid base member with mounting tabs protruding therefrom;

FIG. 4 is a cross-sectional view taken along line 4—4 of FIG. 1 showing the upper resilient member with angled strips imbedded therein, and the rigid base member connected to said angled strips;

FIG. 5 is a side view of another embodiment of this invention;

FIG. 6 is an end view of the embodiment of FIG. 5;

FIG. 7 is the bottom plan view of the embodiment of FIG. 5 showing the rigid base member and the mounting tabs;

FIG. 8 is a cross-sectional view taken along line 8—8 of FIG. 5 showing the upper resilient member and the lower rigid base member, and the sponge-like filler in between the upper and lower members.

DESCRIPTION OF THE PREFERRED EMBODIMENTS

While the teachings of the present invention can be suitable for use in different applications, one application in which the invention can be put is for providing a cap for an armrest of a chair, such as a passenger seat of an airplane. Such a cap will be hereinafter described with respect to two different embodiments shown in FIGS. 1-4 and FIGS. 5-8; however, it is to be emphasized that the invention is broader in scope than the limitations recited with respect to the description which follows.

As illustrated in FIGS. 1-4, armrest cap 10 of the present invention includes an upper member 12 of resilient material and a lower base member 14 which is generally rigid and essentially in the form of a plate. For this purpose, member 12 is molded from polyurethane or other suitable plastic, and member 14 is formed from aluminum or a suitably rigid plastic. Member 12 has a top wall 16 provided with a generally convex upper surface and a pair of sides 18, top wall 16 and sides 18 being integral with each other. The outer surfaces of the top wall and the sides are generally smooth and the junctions between them are slightly curved, so that there is a smooth merger between the top wall and the sides with no sharp edges in these two junctions. The lower edges 20 of sides 18 are formed around angled strips 22 so that said angled strips are permanently imbedded in sides 18. Ledges 24, extending from the inner surface of sides 18, bear on the uppermost surface of angled strips 22, thus serving to maintain the positions of said angled strips in relation to sides 18. For this purpose, angled strips 22 should be made of the same material as lower member 14, either metal or a suitably rigid plastic.

Member 12 may also contain a plurality of relatively thin, spaced partitions 26 extending from the inner surface of wall 16 and spanning the distance between sides 18. Member 12 may also include a relatively thin spine 28 which extends from the inner surface of wall 16 and spans essentially the entire length of member 12. Partitions 26 and spine 28 extend vertically from wall 16 only a portion of the distance between wall 16 and lower member 14, as shown in FIG. 4. The resulting air pockets 30 allow considerable deflection of wall 16 before partitions 26 and spine 28 engage member 14, at which point the compressive strength of member 12 increases substantially, due to the resistance of partitions 26 and spine 28. Air pockets 30, partitions 26, and spine 28 operate together to impart a cushion-like quality to cap 10, thus enhancing its desirability for use as an armrest pad. By placing the partitions 26 at spaced intervals along the length of member 12, the durability of the upper part is assured regardless of where a force is exerted on top wall 16, and cap 10 will have, as a result, a relatively long operating life.

Lower member 14 consists of an essentially flat, rigid, plate-like sheet, and may contain mounting tabs 32 and 34 permanently connected near each end, for connection with the desired seat structure. Member 14 may also contain mounting holes (not shown) in addition to or instead of mounting tabs, as required by the application. The location, configuration, and number of tabs or holes may be altered as desired to meet the mounting requirements of the particular application.

Members 12 and 14 are assembled as shown in FIG. 4, with mounting tabs 32 and 34 extending away from member 12. If angled strips 22 and member 14 are made of metal, spot welds may be used along contact points 36 to permanently connect member 14 to strips 22. If strips 22 and member 14 are made of plastic, a suitable adhesive may be applied along contact points 36 to permanently connect member 14 to strips 22. Member 14 is generally adhered to angled strips 22 after air pockets 30 have been formed. Member 12 may be formed about strips 22 by injection molding techniques known to those skilled in the art.

As illustrated in FIGS. 5-8, an alternative embodiment of the present invention is shown having armrest cap 110 defined by an upper, resilient member 112 and a lower, generally rigid base member 114. Member 112 is typically molded of polyurethane or a suitable plastic, and member 114 is typically formed of aluminum. Upper member 112 has a top wall 116 provided with a generally flat or convex upper surface, and a pair of sides 118. Top wall 116 and sides 118 are integral with each other. The outer surfaces of the top wall and the sides are generally smooth and the junctions between them are slightly curved as shown in FIG. 8, so that there is a smooth merger between the top wall and the sides with no sharp edges at these two junctions. Sides 118 are molded such that an exterior surface 120 and an interior surface 122 are present, surfaces 120 and 122 being integral with each other. As shown in FIG. 8, surfaces 120 and 122 merge to form essentially rounded edges 124 and internal slots 126 within sides 118, slots 126 being essentially vertical and bounded by surfaces 120 and 122.

Lower member 114 consists of an essentially flat, rigid plate-like top surface 128 and a pair of walls 130. Walls 130 function to retain lower member 114 in communication with upper resilient member 112 in a manner similar to angled strips 22 of the other embodiment as shown in FIGS. 1-5. Member 114 may also be slightly curved, as shown in FIG. 5. Top 128 and walls 130 are integral with each other and merge to form an angle of approximately 90°, as shown in FIG. 8. Member 114 may also contain mounting tabs 134 and 136, permanently connected to surface 128. Alternatively, or in addition to the mounting tabs, member 114 may contain mounting holes (not shown). The locations, number, and configuration of the tabs or holes may be altered as desired to meet the mounting requirements of the particular application.

As shown in FIG. 8, members 112 and 114 are removably connected by placing sides 130 of member 114 into slots 126. Since member 112 is molded of a relatively resilient yet pliable material, surfaces 120 and 122 may be spread apart to facilitate the insertion of sides 130 into slots 126. After being released, surfaces 120 and 122 will return to their original positions, fitting relatively tightly around sides 130, thus securing member 112 to member 114. Suitable injection molding techniques may be employed to form member 112 for a snug fit about member 114. The resiliency of cap 110 may be improved by filling the space between members 112 and 114 with a sponge-like filler 132. Filler 132 serves to increase the compressive strength of member 112 by resisting a vertical force applied to wall 116. Filler 132 should be made of a relatively soft, pliable material that is sufficiently resilient so that it will return to its original shape after the load on top 116 is released.

What is claimed is:

1. An arm rest cap comprising:
   a lower rigid base member for securing said cap to a passenger seat;
   an upper resilient member positionable over said base;
   a pair of angled strips having a vertical portion and horizontal portion wherein said vertical portion and the upper surface of said horizontal portion are embedded within said upper resilient member and the lower surface of said horizontal portion engages said lower rigid base member.

2. The apparatus according to claim 1, wherein:
   said base may be secured at contact points to said angled strips.

3. The apparatus according to claim 1 wherein:
   said upper resilient member includes a central, depressible cavity.

4. The apparatus according to claim 3, wherein;
   said cavity includes support partitions formed integral therewith.

5. The apparatus according to claim 1, wherein:
   said upper resilient member is injection molded about said angled strips.

6. A method of making an arm rest cap, said method comprising the steps of:
   providing a pair of angled strips having a vertical portion and horizontal portion;

injection molding an upper resilient member about said vertical portion and an upper surface of said horizontal portion of each one of said pair of angled strips to retain and envelope said angled strips and provide a resilient arm rest surface;

providing a lower rigid base member for securing said arm rest cap to a passenger seat, said lower rigid base being engageable with the lower surface of said horizontal portion of each one of said pair of angled strips.

7. The method according to claim 6 further comprising the steps of:

providing mounting tabs connected to said lower rigid base for securing said cap to said passenger seat.

8. The method according to claim 6 further comprising the steps of:

providing air pockets within said upper resilient member separated by support partitions.

9. An arm rest cap comprising:

a pair of angled strips having a vertical portion including an inner and outer surface and a horizontal portion including an upper and lower surface;

a resilient member injection molded about said vertical portion and said upper surface of said horizontal portion of each one of said pair of angled strips, said pair of angled strips being connected to said resilient member by contact of said resilient member to said inner surface and said outer surface of said vertical portion and said upper surface of said horizontal portion of each one of said pair of angled strips;

a lower rigid base member for securing said cap to a passenger seat, said lower base member being connected to the lower surface of said horizontal portion of each one of said angled strips.

* * * * *